(12) United States Patent
Rabin et al.

(10) Patent No.: US 8,863,089 B2
(45) Date of Patent: Oct. 14, 2014

(54) METHOD AND APPARATUS FOR VISUALIZING COMPUTER PROGRAM EXECUTION

(75) Inventors: Steve Rabin, Bothell, WA (US); Chad Hinkle, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 469 days.

(21) Appl. No.: 13/101,449

(22) Filed: May 5, 2011

(65) Prior Publication Data

US 2012/0222017 A1    Aug. 30, 2012

Related U.S. Application Data

(60) Provisional application No. 61/446,958, filed on Feb. 25, 2011.

(51) Int. Cl.
  *G06F 9/44* (2006.01)
  *G06F 9/45* (2006.01)
  *G06F 11/30* (2006.01)
(52) U.S. Cl.
  CPC ..................... *G06F 11/30* (2013.01)
  USPC ............ 717/125; 717/127; 717/130; 717/158

(58) Field of Classification Search
  None
  See application file for complete search history.

(56) References Cited

U.S. PATENT DOCUMENTS

| | | | |
|---|---|---|---|
| 2006/0242636 A1* | 10/2006 | Chilimbi et al. | 717/158 |
| 2010/0079463 A1 | 4/2010 | Rabin | |
| 2010/0083234 A1 | 4/2010 | Rabin | |

* cited by examiner

*Primary Examiner* — Qamrun Nahar
(74) *Attorney, Agent, or Firm* — Nixon & Vanderhye, P.C.

(57) ABSTRACT

Analysis data from the execution of a computer program is collected. The analysis data may include samples of two different types of performance data from the execution of the computer program. Performance data may include sampled hardware performance counter data and sampled executing functions. The performance data is used to create a composite view of the data. The composite view may allow a user to efficiently correlate the different types of performance data by using a colored visual display.

22 Claims, 15 Drawing Sheets
(10 of 15 Drawing Sheet(s) Filed in Color)

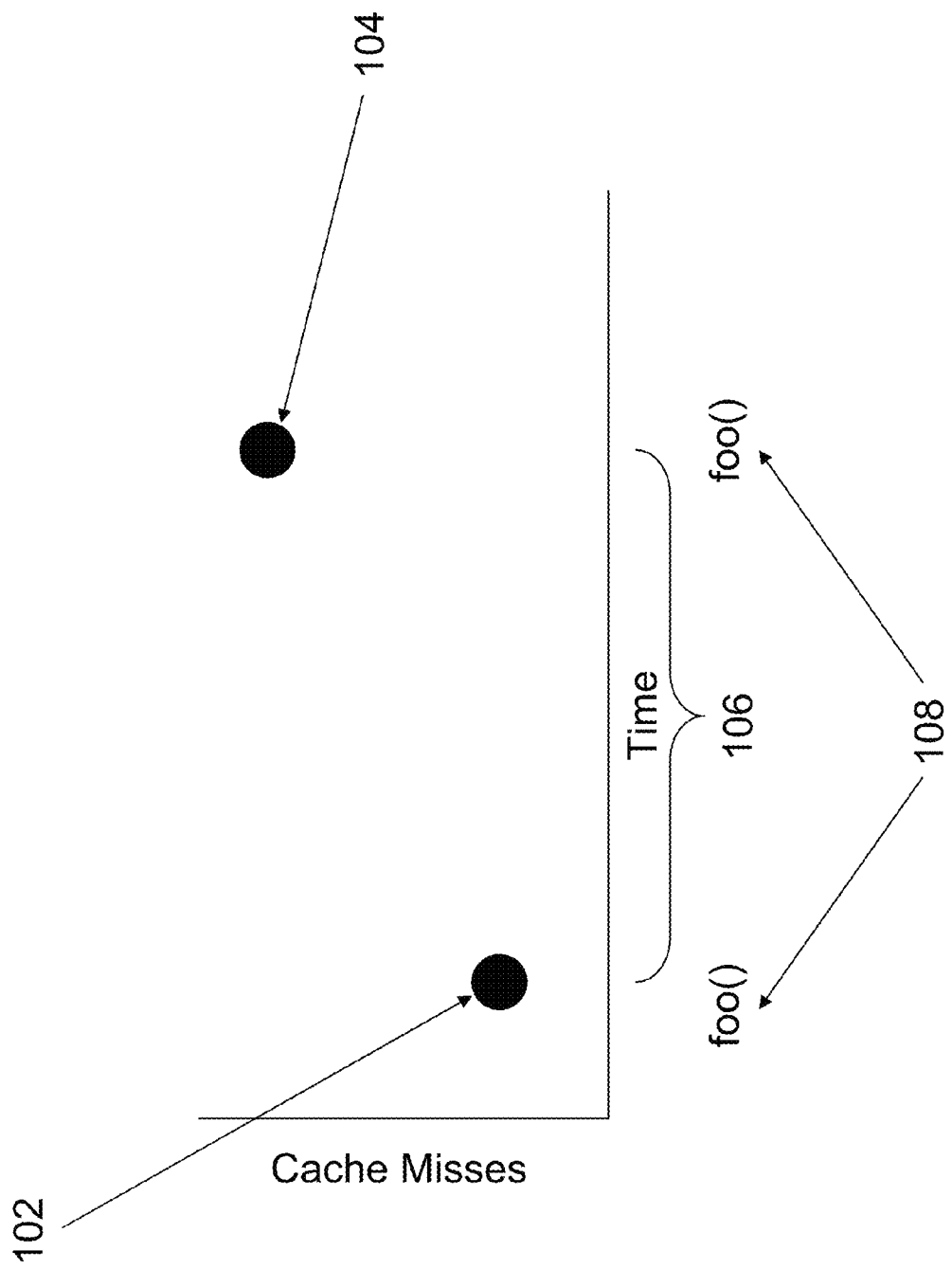

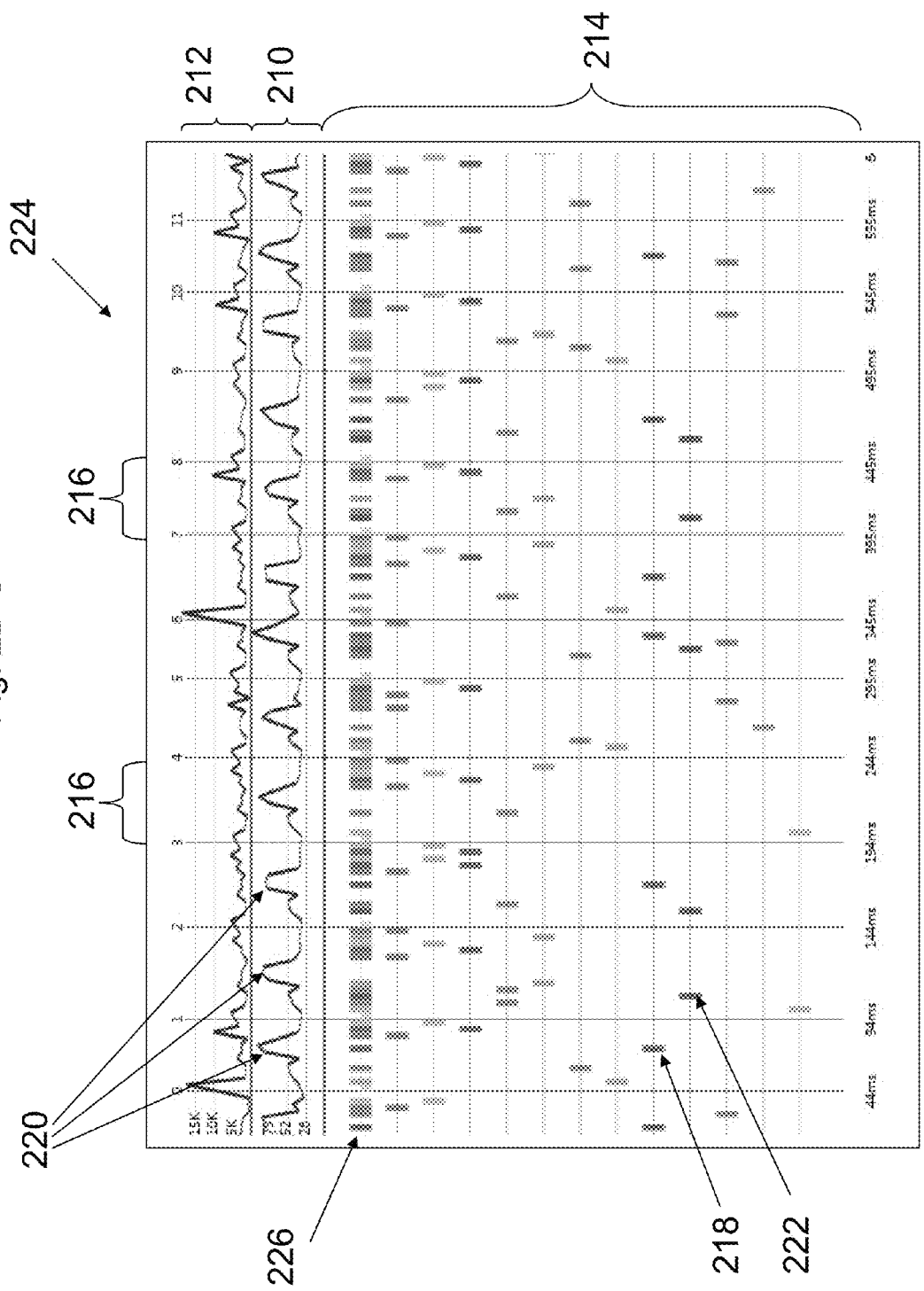
Fig. 2B-C

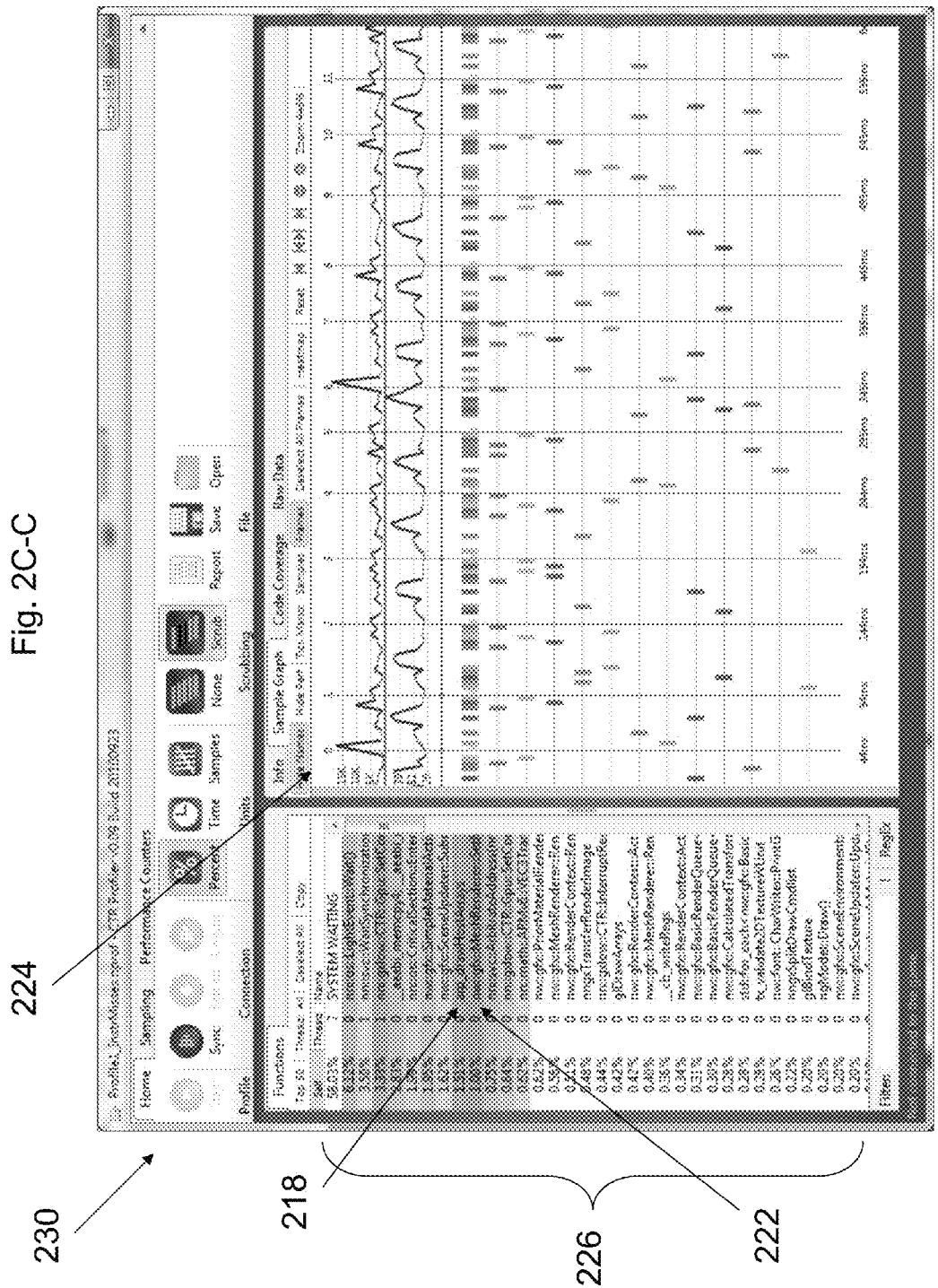
Fig. 2C-C

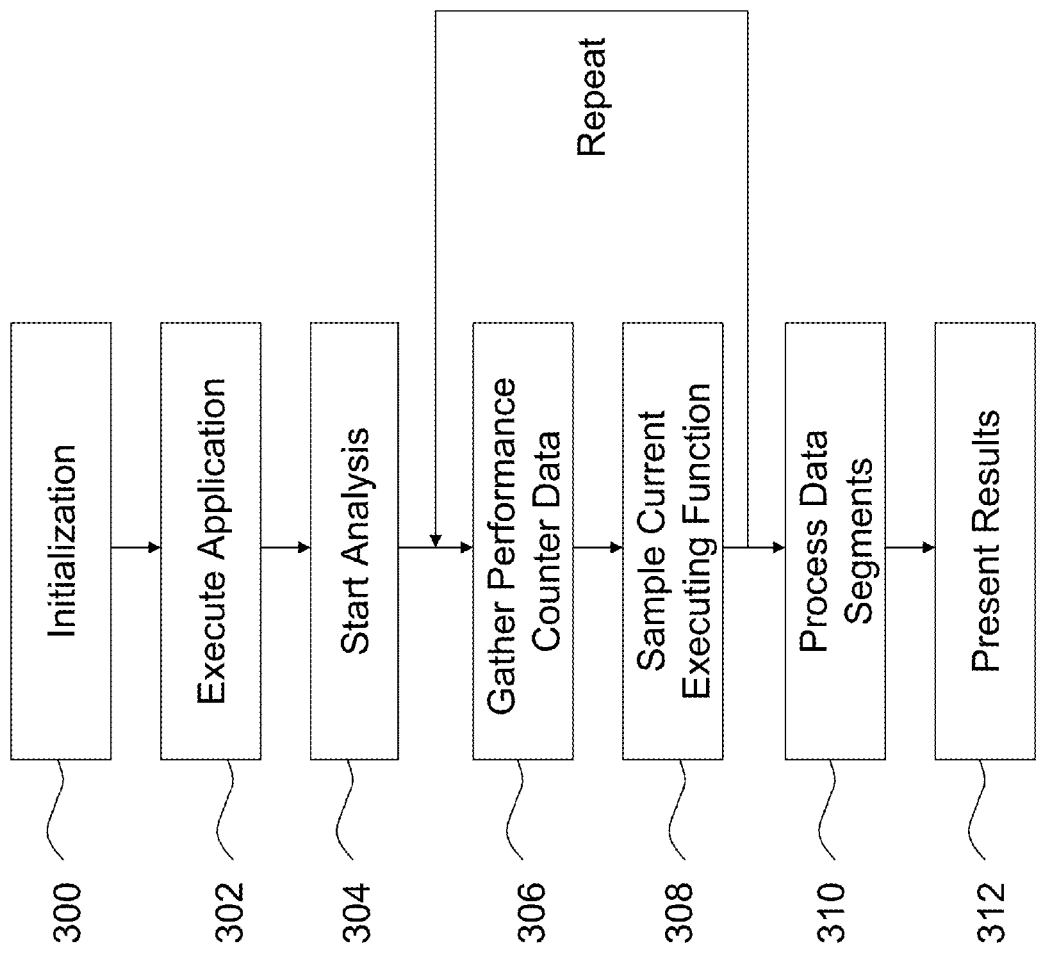

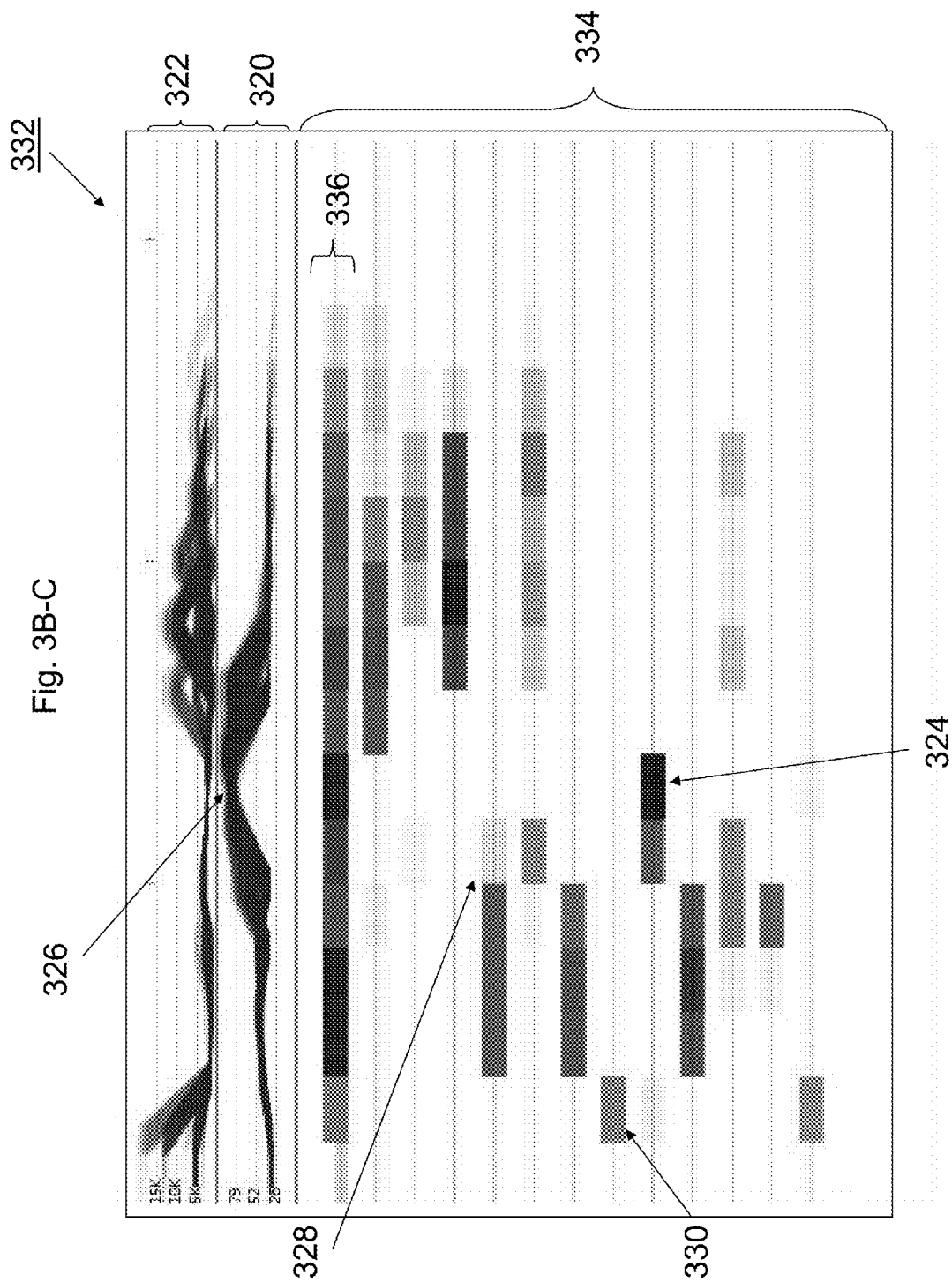

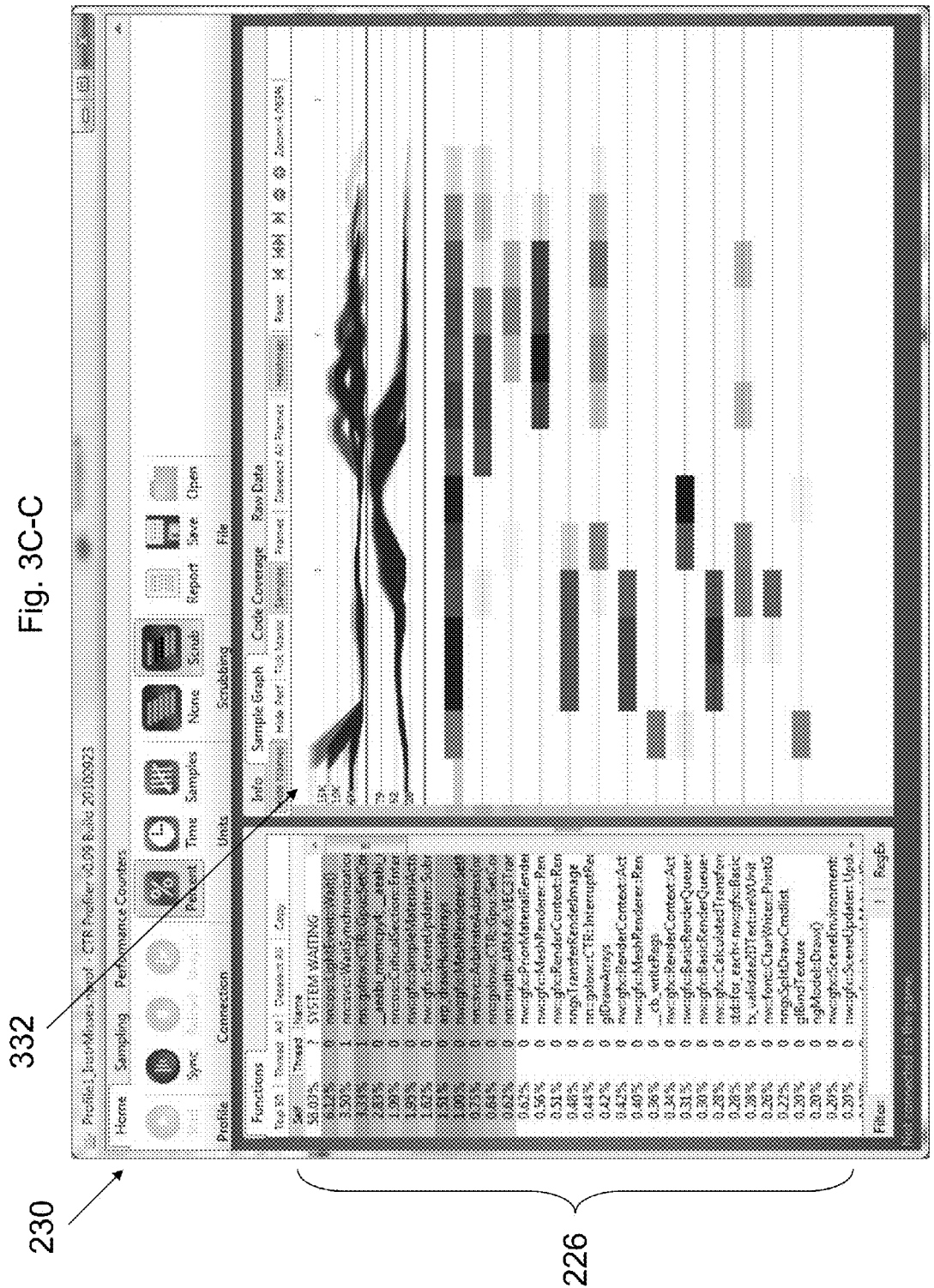
Fig. 3C-C

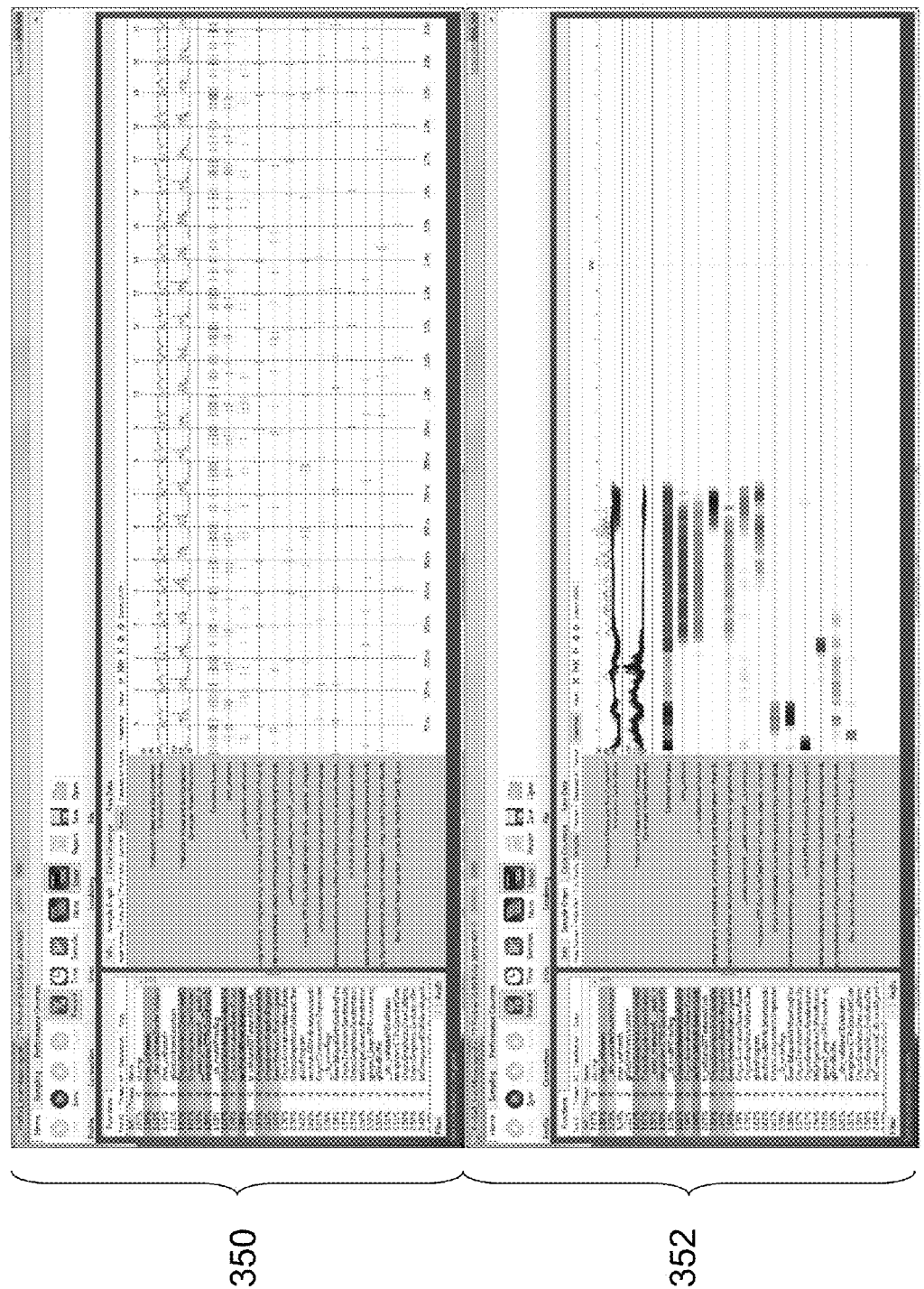
Fig. 3D-C

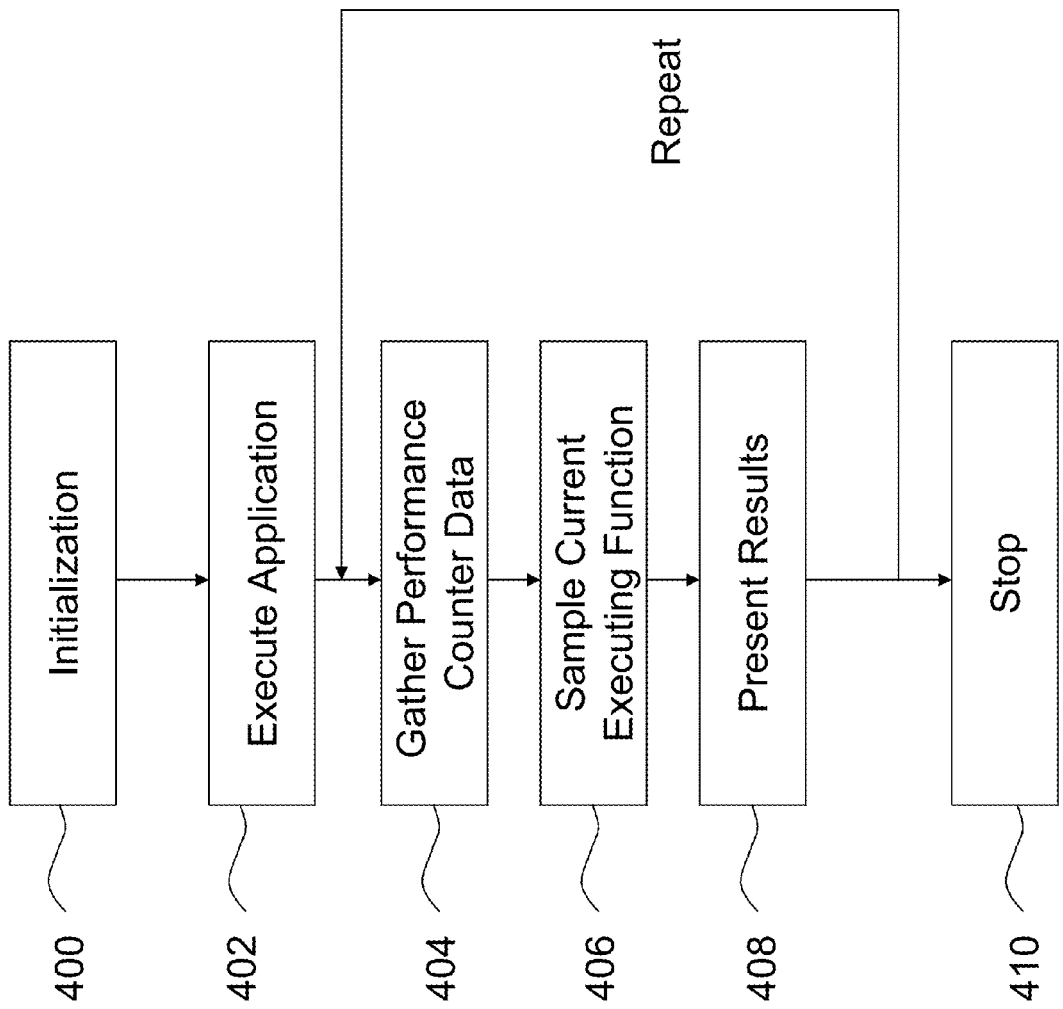

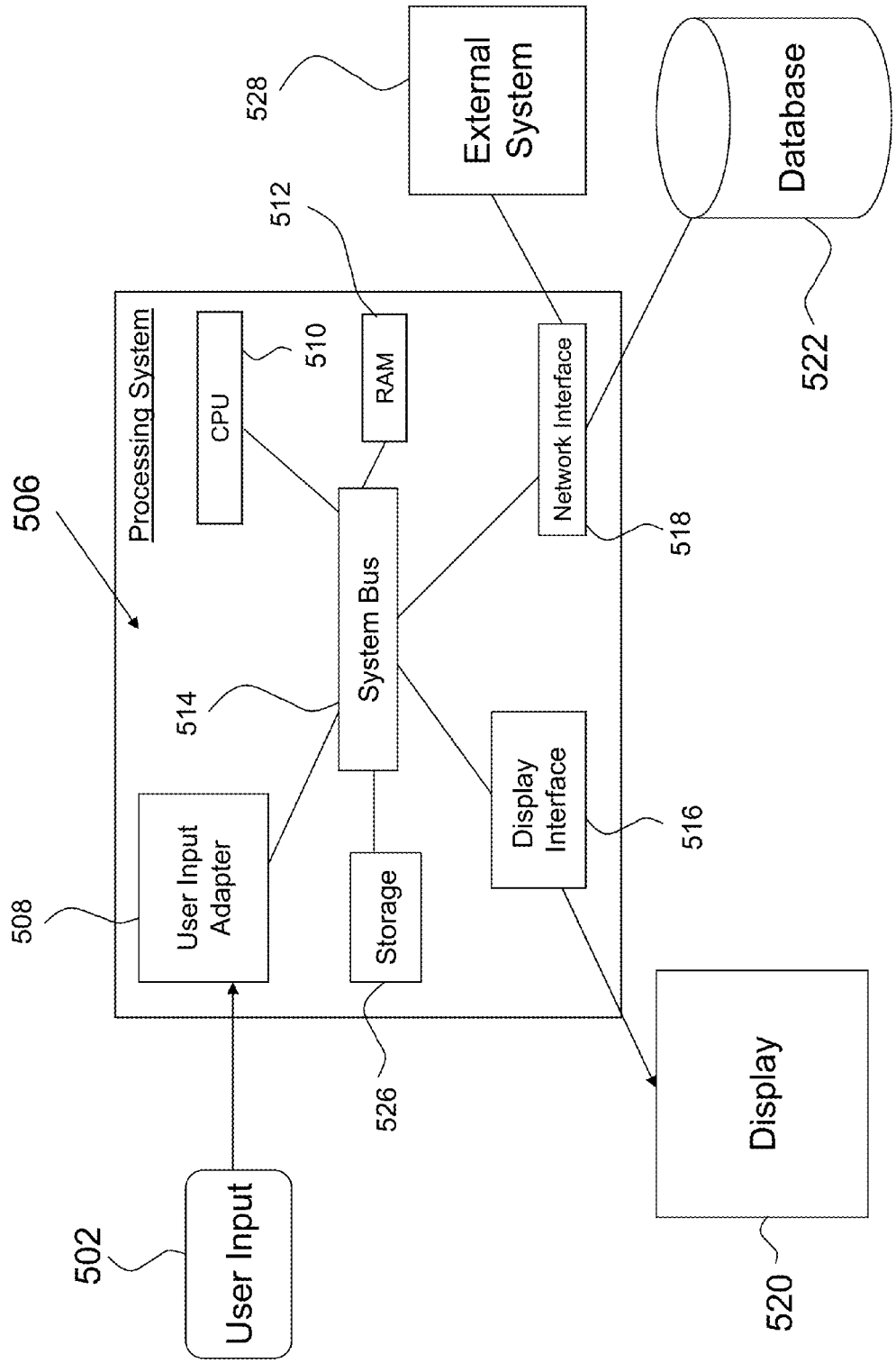

METHOD AND APPARATUS FOR VISUALIZING COMPUTER PROGRAM EXECUTION

CROSS-REFERENCES TO RELATED APPLICATIONS

This application claims priority to U.S. Provisional Application No. 61/446,958, filed Feb. 25, 2011, the entire content of which is hereby incorporated by reference.

FIELD

The technology herein relates to dynamic analysis of computer programs, and more specifically to profiling executing computer program(s) while e.g., sampling performance counters or other parameters related to execution. The technology herein also relates to visualization such as creating a visual composite display of profiled and/or sampled results to facilitate correlation of different types of data.

BACKGROUND AND SUMMARY

Real-time software is everywhere—it runs our cars, elevators, smart phones, video games, hospital equipment, aircraft control systems; and even our refrigerators, home heating systems, washing machines, and others.

As we have become increasingly dependent on software for our everyday needs, efficient and orderly software execution has become increasingly important. In the early days of computing, computers with limited resources lead software developers to make every instruction count. Instructing the computer to do a series of inefficient tasks or to take a detour from the most direct route to a result wasn't an option. Now, as microprocessors, memory, and other computer components are more plentiful, inexpensive, and capable, some software developers pay less attention to code efficiency in the interest of shipping a product more quickly. Automatic code generation from compilers or other similar tools can save hundreds or thousands of man-hours, but such automatically generated code is often not streamlined or efficient. The result can be a poorly performing "bloated" piece of software.

Developing complex computer programs can be large projects that incorporate work from many different contributors (e.g., software engineers, artists, designers, etc). Like most joint efforts, large software projects sometimes perform poorly. Even simple programs may include such problems. Efficiently tracking down these and other problems can help to create better software.

One technique of tracking down problems and inefficiencies in software is to manually review the code. However, manually reviewing thousands or millions of lines of code can be incredibly complex and time consuming. Furthermore, the interaction of disparate components of an application is often difficult to understand. As a project becomes more and more complex (e.g., as more lines of code are added and more systems interact with each other), the overall complexity of manually reviewing the code of the application may increase exponentially.

One technique that may improve upon this manual method is to use tools such as software profilers. A profiler tool gives a user the ability to monitor the dynamic (e.g., run-time) behavior of a computer program. For example, information retrieved by running a profiler against a computer program may provide information on problematic sections of the computer program (e.g., sections that are operating slowly, etc).

Typically, profilers provide information related to the execution status of the software: for example, the number of times a particular function has been called, the amount of time a processor spends doing a particular function, or the amount of memory the program is consuming over time. A software developer may use this information to narrow down or identify a particular section of code (e.g., a function) that is the source of inefficiencies.

Information retrieved by a profiler is sometimes presented to a user in a textual format. For example, the number of calls to a particular function, or the amount of time spent executing a particular function, may be presented in a textual or tabular form. Text presentations are relatively simple and may be satisfactory for displaying one type of information (e.g., a number of function calls). However, a user wishing to correlate two different types of information may have difficultly doing so with a purely textual or tabular representation of the data.

A common saying is that "a picture is worth a thousand words." Complex ideas and/or the correlation of large amounts of data can be made more readily understandable when presented in a visual format as opposed to a textual display. One technique for visualizing profile data is disclosed in U.S. Patent Publication No. 2010/0079463, the entire contents of which are hereby incorporated by reference. However, additional visualization techniques may be useful or desirable.

One interesting technique for visually presenting large amounts of information is a heat-map. Generally, heat-maps graphically represent variable information over a geographical area. As an example, when it is desired to relate or correlate various types of information to population density, presenting the information in a heat map can allow a person to quickly draw correlations or conclusions from the density and location information presented in the same composite view. For example, high population densities may be dark red while lower densities may be light red, with varying shades of red in-between the minimum and maximum state population densities. Thus, using the heat map, a person may draw inferences and conclusions regarding how two separate pieces of data may be correlated or related. The increased ability to correlate data may be facilitated by the ability to provide information along another dimension (e.g., relative location) without substantially detracting from the population density information (e.g., the color information).

It would be desirable to develop systems and/or methods that provide improved software analysis functionality for computer programs by improving the manual and/or automatic correlation of hardware performance counter or other data with functional information.

The technology herein thus relates to presentation, analysis, and/or correlation of sampled analysis data.

Certain computer programs, such as video games, are highly repetitive and predictable in terms of the code they execute. This occurs because visual output is typically displayed at predetermined intervals (e.g., 30 or 60 times per second). The visual output may then be tied to a repetitive cycle of simulation and rendering for each displayed frame. Accordingly, the simulation and rendering may be similar, but not identical, from frame-to-frame. This similarity in execution between frames may create a temporal coherence between the frames.

In certain instances, when profiling or measuring the performance of a computer program it may be desirable such that the measurements are unobtrusive with respect to the natural behavior of the program and/or hardware (e.g., with respect to computation, memory, bus traffic, etc). One technique for achieving this is to apply sampling to infrequently sample the current state of the program and/or hardware in order to construct a statistical picture of how the system is behaving. This sampled data may result in a large dataset that approximates program behavior over the duration of the measurement.

Because video games are frame-based, executing similar (but not always exact) code pathways for every frame or game tick, one may be able to assume that sample data from each frame will also be similar. For example, if simulation code is near the beginning of each frame, then the sample data may contain samples of simulation code near the beginning of each frame. By overlaying the sample data from each frame, trends in the data may be observed by a user. The overlaying may create a picture of what happens in a typical frame.

Profiling using statistical sampling results from one sample may not be very reliable as the sample was just a brief moment in time. However, sampling the CPU performance counters at the same rate may be different since performance counters accumulate data between samples. Correlating function samples and performance counters samples may be difficult and unreliable because each measurement is directed to different time periods (e.g., an infinitesimal moment in time versus the time between samples).

In certain instances, one solution for improving the understanding of the correlation between the different types is to overlay both types of sampling data aligned by the frame. This may allow unreliable individual function samples to overlay and show trends along with trends in the performance counter data.

Accordingly, the following non-limiting features and/or advantages may include: 1) Overlaying statistical CPU performance data, aligned by the frame; 2) Overlaying statistical function data, aligned by the frame; 3) Correlating the trends of each to glean as to which functions caused unusual CPU performance data;

In certain non-limiting illustrative embodiments, the software program is a structured and repetitive software program, such as, for example a video game. In certain non-limiting illustrative embodiments, the sampled data is presented in a color based visual display to facilitate correlation of different data types.

In certain example embodiments, a visual display of profiled data from a computer program is presented to a user. In certain example embodiments, the visual display may include sampled executed functions and hardware performance counter data. The visual display of these two pieces of data may facilitate correlation of the two pieces of data by a user.

In certain example embodiments, sampled functional and hardware performance counter data is based on the execution of a video game. In certain example embodiments, sampled data is overlaid and/or blended into a composite view based on each frame of execution of the video game.

In certain example embodiments, statistical CPU performance and/or statistical function data is aligned along a frame of execution of a computer program. In certain example embodiments, the alignment and blending of the functional and performance data on a frame by frame basis acts as a heat-map facilitating visual identification of correlations between the two pieces of data.

In certain example embodiments, a computer implemented method for gathering and presenting statistical data of a computer program is provided. A computer program is executed on a processing system over a period of time that is divided into a plurality of substantially equal data segments. A first type of profile data from the executing computer program is sampled. A second type of profile data from the executing computer program is sampled. In certain example embodiments, the first and second types of profile data are different types of data. A fractional value is assigned for each of the first and second types of profile data within each of the plurality of substantially equal data segments. A composite presentation of the first and second type of profile data is created by combining each of the plurality of substantially equal data segments in a single segment substantially equal to one of the plurality of substantially equal data segments. The composite presentation is presented.

In certain example embodiments, a non-transitory compute readable storage medium tangibly storing instruction that, when processed by at least one processor, execute the stored instructions. The stored instructions being configured to interact with an executing program. The stored instructions being configured to sample performance data from the executing computer program over a plurality segments. At least one sample of performance data sampled for each one of the plurality of segments. The stored instructions further configured to display a combined view of the sampled performance data from each of the plurality segments. When sampled performance data from one of the plurality of segments coincides with sampled performance data from another one of the plurality of segments the displayed combined view of the sampled performance data is changed in color and/or intensity. In certain example embodiments the sampled performance data includes sampled performance counter data and sample function data.

In certain example embodiments, a computer analysis system for presenting performance data to a user is provided. At least one microprocessor is configured to execute a target computer program. The target computer program is configured to execute similar code pathways for each one of a plurality of data segments. The at least one microprocessor is further configured to record performance counter information on the target computer program when the target computer program is executed on the at least one microprocessor. A processing system is also provided that is configured to sample performance that is associated with the executing target computer program at least once for each of the plurality of data segments, the performance information including recorded performance counter information and a section of source code that is associated with the recorded performance counter information. The sampled performance information is drawn into a composite display. A display value in the composite display is adjusted when sampled performance information from one of the plurality of data segments overlaps with the sampled recorded performance counter information from another one of the plurality of data segments. The composite display is presented to a user.

In certain example embodiments, a method for displaying statistical data of a computer program having a periodicity is provided. Profile sample data relating to the execution of the computer program is obtained. A heat map of the profile sample data with respect to the periodicity is graphically displayed. The profile sample data is overlaid to develop the graphical display; thereby varying intensity of the graphical display to indicate overlap of the profile sample data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages will be better and more completely understood by referring to the following detailed description of exemplary non-limiting illustrative embodiments in conjunction with the drawings of which:

FIG. 1 is an illustrative graph showing sampled analysis data;

FIGS. 2B-C and 2C-C are corresponding color drawings of FIGS. 2B and 2C, respectively;

FIG. 3A shows an illustrative flow chart of a non-limiting computer program control structure for analyzing a computer program according to certain example embodiments;

FIGS. 3B-C, 3C-C, and 3D-C are color drawings corresponding to FIGS. 3B, 3C, and 3D respectively;

FIG. 4 is an illustrative flow chart showing a computer program control structure for analyzing a computer program in real-time according to certain example embodiments;

FIG. 5 is an exemplary illustrative non-limiting block diagram showing a computer system implementing an exemplary software analysis program.

DETAILED DESCRIPTION

Figure 2A:
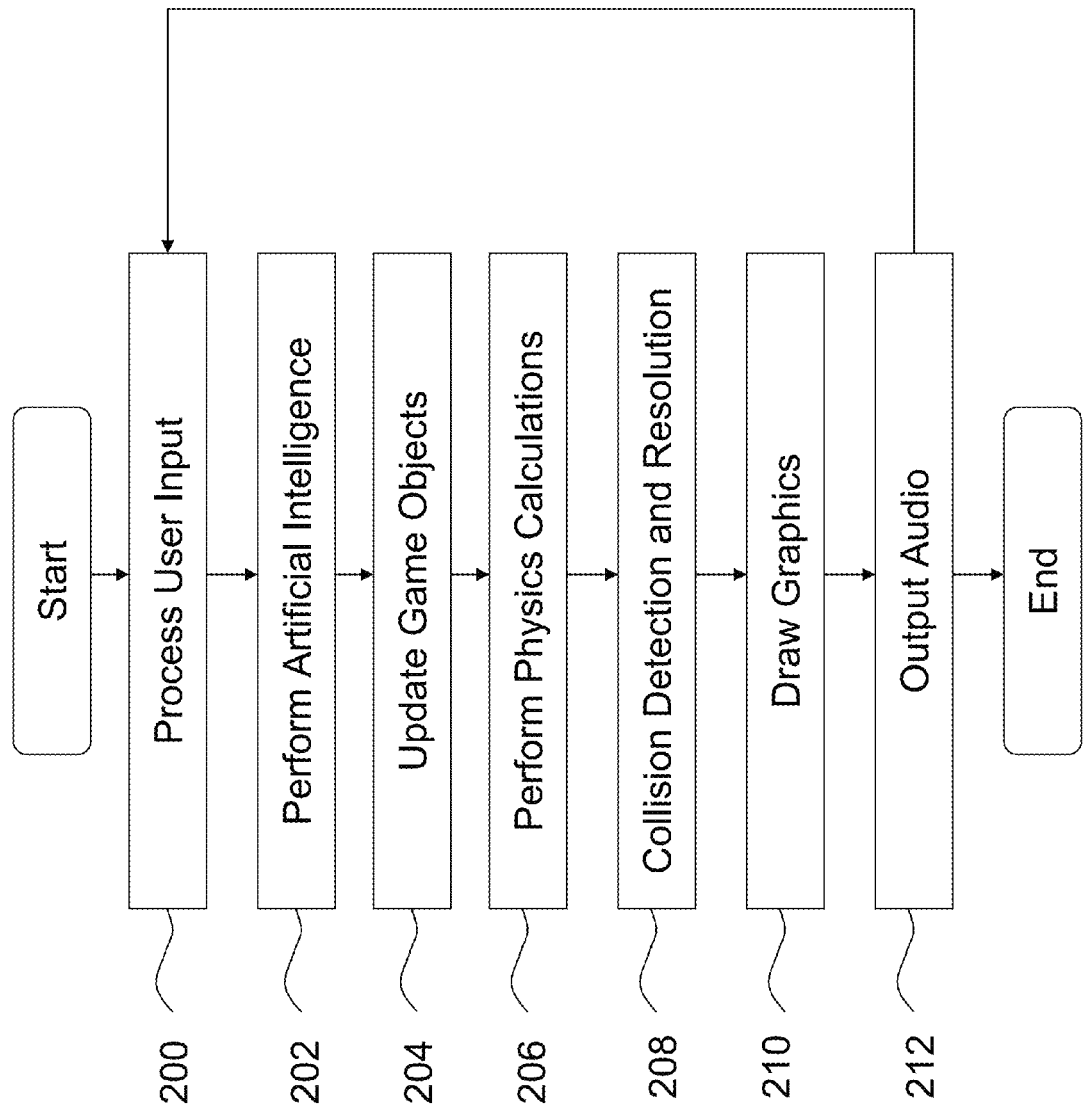
FIG. 2A shows an example flow chart of example computer program control structure executed in a video game on a frame-by-frame basis.

Generally speaking, profiling retrieves data on the dynamic execution of a program. In profiling there are traditionally two types of categories: instrumentation and statistical sampling.

With instrumentation, code is injected into the software (e.g., a stop watch that encompasses a function call). The additional code reports information to a log file or through some other similar technique. The information may then be parsed and presented to a user (e.g., in a tabular form as noted above). The injection of outside code into a running program can degrade the performance of the original program. For example, if a function is called many times (e.g., as part of a tight loop), the injection of code around each of the many function calls for the function may result in over evaluating the amount of time spent repeatedly calling the function (e.g., because of the overhead of the injected code). In one context, the delay caused by heavy instrumentation can be large enough to render a video game unplayable or no longer representative of actual game play.

Accordingly, in certain instances, it may desirable for measurements that have a relatively reduced impact on the natural behavior of the program (with respect to computation, memory, bus traffic, etc).

Periodic sampling of the state of a computer program may address some of the above issues with respect to instrumentation. Instead of injecting excess code into a running program, a sampling method may periodically stop execution of the program (e.g., based on a timer) and/or take a "snapshot" of the current state of the program at a given moment in time. By taking thousands or millions of samples, a picture of the execution of a program may be constructed.

However, the relative importance or relevance of even visually displayed information may be hard to determine. Code or a function that falls within a large percentage of samples may be operating very efficiently. Further, sampling at a predetermined rate (e.g., a fixed interval) may result in some areas of source code being oversampled and other areas being undersampled. Certain sampling techniques may be found in U.S. Patent Publication No. 2010/0083234, the entire contents of which are incorporated by reference.

In certain instances, sampling may not provide enough information to a user (e.g., a software developer) to help diagnose a perceived problem with a program. For example, source code does not run in an abstract environment, but instead is run on hardware of a computer system. The interaction between the hardware on a computer system and executable code may result in adverse results that may not be apparent from just viewing the source code of an application. For example, unusual CPU performance may result from running a particular piece of code on a given type of microprocessor. Such performance issues may not be immediately traceable by simply viewing traditional runtime information of the source code.

One technique of gathering other types of information relating to the execution of a program is to use hardware performance counters. Such counters are found on most microprocessors. Depending on the manufacturer, hardware performance counters measure a variety of events that occur at the hardware level when a computer program is being executed. The monitored events may include, for example, the number of cache misses that occur when fetching a given instruction, the number of cycles per missed instruction, the number of incorrect branch predictions, etc. Thus, the tracked counter may provide a software developer with information that can be used to diagnose performance problems and/or provide a greater understanding to how an executing program interacts with a given piece of hardware.

The events monitored by a microprocessor are typically stored (in the form of a counter) in hardware registers. Thus, each time the retrieval of an instruction results in a cache miss, the cache miss counter is incremented. To retrieve a counter a user typically turns on the counter functionality on the microprocessor and the counter is then automatically updated for the specified event. Subsequently, the counter information may be periodically accessed to retrieve the stored counter value.

Analysis of the recorded counter information may allow a software engineer to determine that the number of cache misses during a time period is abnormally high and may be the cause of adverse performance in a computer program.

However, while performance counters may provide valuable information, the counters operate on a level that is different from source code. Tracing back a given interval of execution associated with a counter value (e.g., a high cache miss rate) to a specific section of code can be difficult because many different sections of code (e.g., functions) may have been executed during the interval period.

FIG. 1 shows an illustrative graph with data points related to performance counter information of an executing computer program. Points 102 and 104 represent performance counter data retrieved by an analysis program. The time period between the two points is shown as an interval 106. Accordingly, point 104 represents the performance counter information based on the period specified by the interval 106. Correspondingly, point 102 represents performance counter information gathered from before timer interval 106.

Time periods 108 specify the functions executed when the analysis program recorded (e.g., retrieved) the counter information. In both instances, the function recorded was the function "foo( )." For a person viewing the illustrative graph it may be difficult to draw a correlation between the recorded function "foo( )" and the retrieved counter value because "foo( )" may not relate to portions of code that executed during the time interval 106. For example, another function "bar( )" may have executed during a majority of the time period 106 and may, in fact, be responsible for the increase in cache misses.

FIG. 2A shows an example flow chart of processes that may be executed by a video game for each frame that is displayed. It will be appreciated that each of the shown processes may include many different functions that carry out the shown process. Further, it will be appreciated that other processes may be implemented depending on the needs of the video game (e.g., networking code).

Figure 2B:
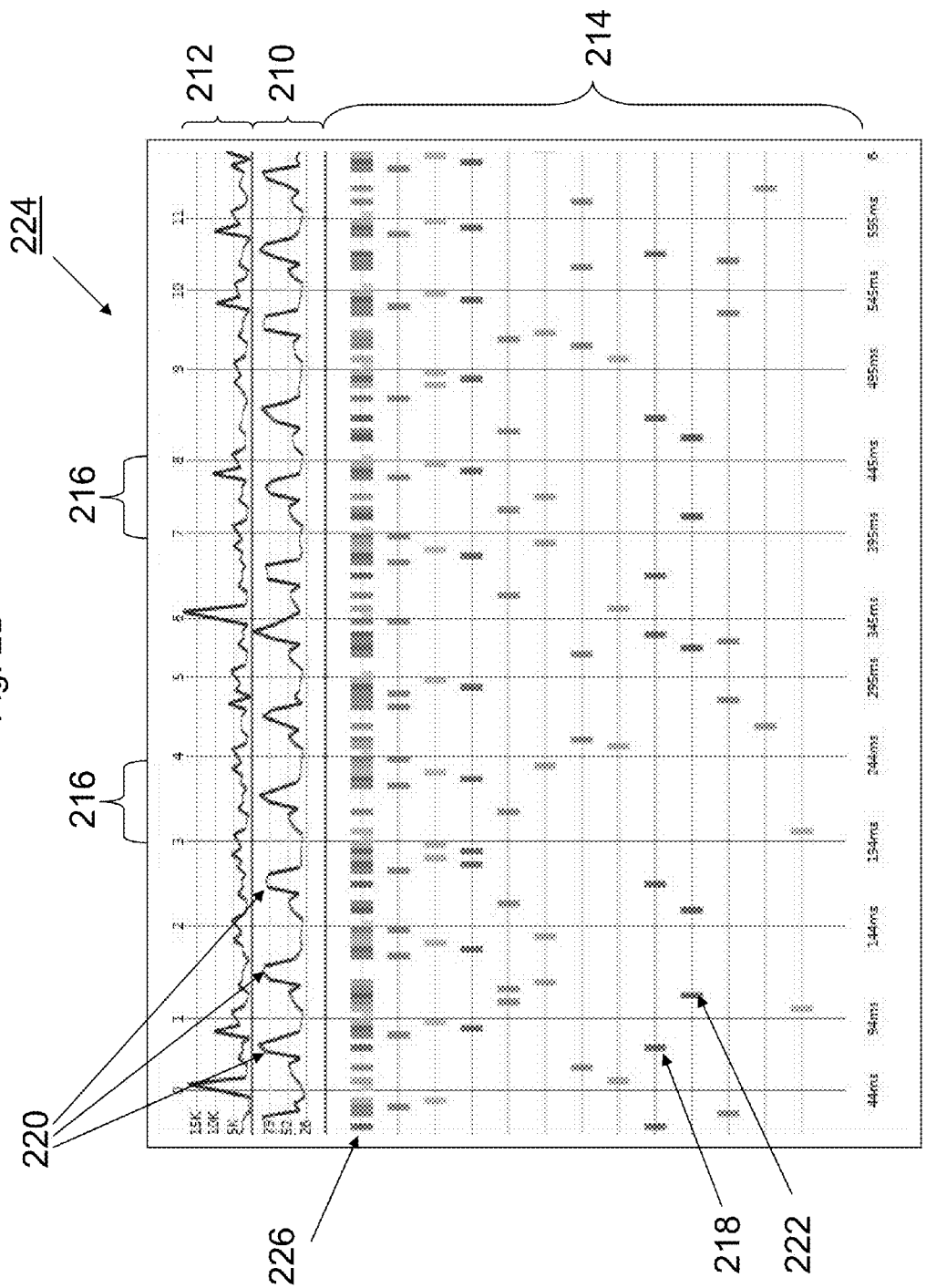
FIG. 2B shows example retrieved hardware performance counter data and sampled function data of an exemplary computer program.
Figure 2C:
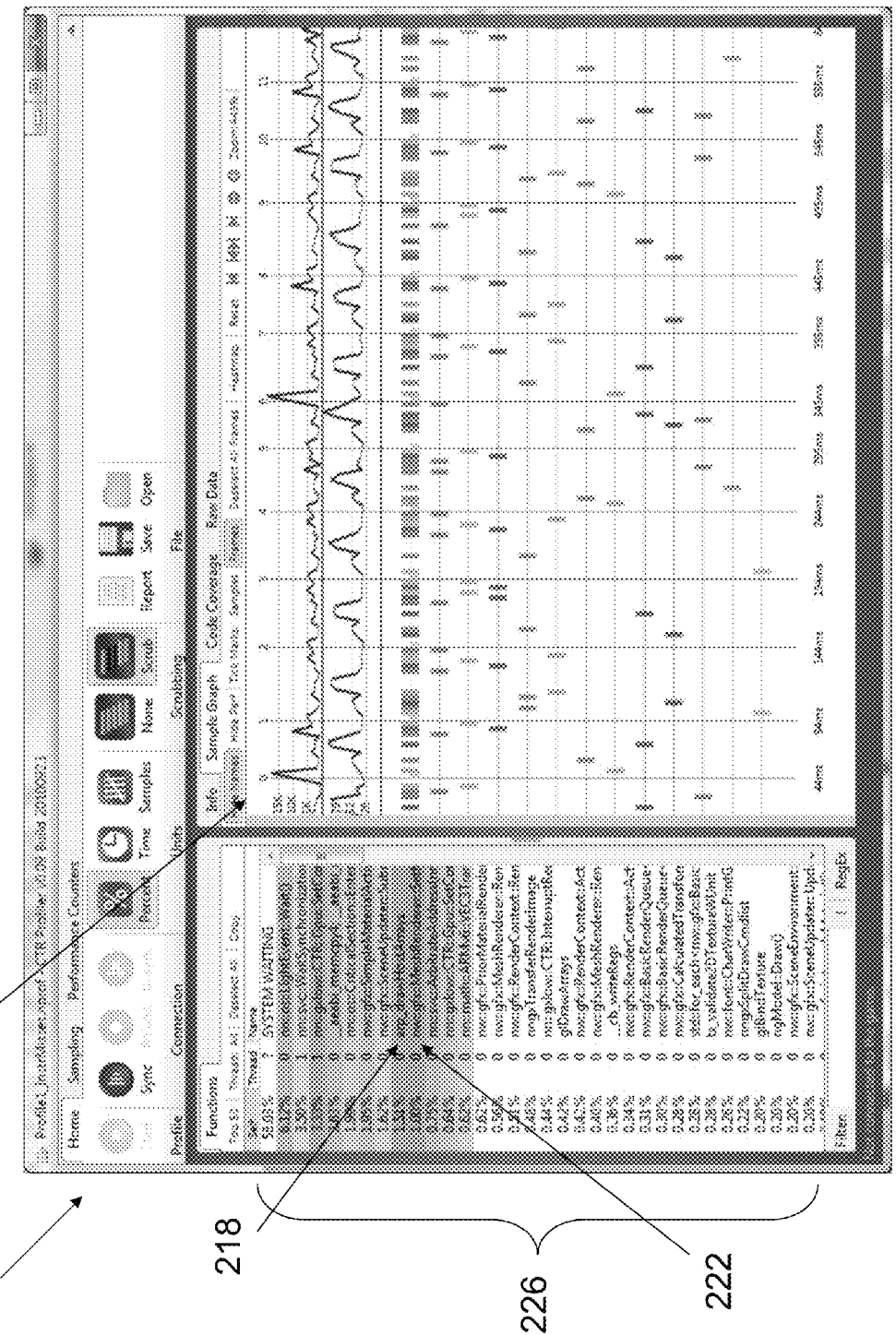
FIG. 2C shows an illustrative screenshot that corresponds to the retrieved hardware performance counter data shown in FIG. 2B.

As show in FIG. 2A, after starting the game, the "main" game loop begins by processing user input in step 200. This may include input from a game controller, keyboard, mouse, touchpad, or the like. Next, in step 202, artificial intelligence calculations may be performed. Here, the program may determine how certain game objects (e.g., non-player characters) move or act. In step 204, the game process updates the game objects of the simulation. Once updated, then in step 206, physics calculations are run to determine how the game objects interact with the world (and each other). Next, in step 208, collision detection and resolution may be performed. After performing the above steps to update the status of the game scene a result of the simulation may be graphically presented in step 210. For 3D animations, this may involve a submission of vertex information to a video card. However, other types of drawing may be done such as, for example, 2D animation. In any event, once the graphics are presented to the user, audio processing may occur in step 212. As noted above, the above processes may occur at 30/60 times per second. It will be appreciated that the order of the above processes may be changed based on considerations, such as, game architecture. Further, some steps may be removed, or additional steps added. Certain video games may use multiple threads to execute various processes. Accordingly, some processes may operate faster or slower than the main loop and associated updates of the game simulation shown in FIG. 2A FIG. 2B shows exemplary sampled data in a graphical format as a result of sampling an executing exemplary video game, for example a video game executing the processes shown in FIG. 2A. FIG. 2B-C is a color drawing of FIG. 2B. FIG. 2C shows an illustrative screenshot that corresponds to the sampled data shown in FIG. 2B. FIG. 2C-C is a color drawing of FIG. 2C.

An example analysis program 230 includes a graphical window 224. The graphical window includes graphs 210 and 212 that show retrieved hardware performance counter data related to events monitored by a microprocessor executing a computer program. The retrieved data is interpolated to form the shown graphs. In this example embodiment, graphs 210 and 212 relate to "Instruction Misses and Bus Contention." Specifically, graph 210 relates to the number of cycles per missed instruction and graph 212 relates to the number of instruction cache misses. On the lower section of the graphical window 224 is graph 214 showing sampled function data. The functions sampled are represented by the individual markers (e.g., 218 and 222). The names of the sampled functions are shown in function window 226 of FIG. 2C. As shown in the color drawings a subset of functions in the function window 226 are highlighted with a specific color. The highlighted color matches the color of the markers shown in graph 214. For example, the name of the function associated with marker 218 is shown in the function window 226 as "arp- _drawHostArrays." Also, marker 222 relates to function "nw::gfx::MeshRenderer:SetMatrixPalette( )." Accordingly, users may be able to match up data in graph 214 to more specific data found in function window 226 based on the color values. The markers shown along the line at the top of graph 214 are the combined sampled functions 226. This graphical representation shows all of the markers of graph 214 in one combined line of data.

Intervals 216 represent one frame of execution by the example video game being monitored. For example, in one frame of execution the processes shown in FIG. 2A may each be executed once. In this example embodiment, the example analysis program 230 sampled the data shown in graphs 210, 212, and 214 at a rate of around 10 times per frame.

Graph 210 includes a spike or abnormality 220 in the middle of each of the shown frames 216. This abnormality may indicate abnormal CPU performance. Specifically, that the video game being sampled experienced bus contention during a point in program execution. The sampled hardware performance counter data shows the number of cycles for retrieving an instruction jumped from about 30 cycles to around 75 cycles. This contention occurred at varying levels in every frame shown in graph 210. It will be appreciated that tracking down the cause of this abnormality may be desirable in certain instances (e.g., to improve the performance of a video game or the like).

As noted above, traditional techniques often have difficultly in providing enough information to enable a user to correlate a particular value of a performance counter to a particular section of code. For example, markers 218 represent sampled functions at an instant in time. In contrast, the data retrieved from the performance counters represents data over a period of time. As shown in FIG. 2B, the abnormality 220 occurs in each of the frames. When viewing the sampled functions in graph 214, there is no readily ascertainable function (or set of functions) that may be causing the jump shown in graph 210. Indeed, there are no two frames that include the same set of sampled functions for those displayed in the graph 214.

FIG. 3A shows an illustrative flow chart of a process for analyzing a computer program according to certain example embodiments. In certain example embodiments, a performance analysis program includes the process for sampling program information from an executing computer program. The process may be embodied in a computer application (e.g., 230 in FIG. 2C).

In FIG. 3A's step 300 various settings are initialized. For example, a user may enable performance counters on a microprocessor that is to execute the computer program. After initialization, in step 302, the computer program that will be analyzed is started. Next, in step 304, the analysis program may be started. In certain example embodiments, the analysis program and the program to be analyzed may operate on different computer system. Accordingly, a user may attach (e.g., remotely) the analysis tool to the computer program and the system that is running it. Alternatively, the analysis program and the program to be analyzed may run concurrently on the same computer system.

Once both applications are started, then steps 306 and 308 are repeated until stopped. In step 306, performance counter data is gathered from the hardware registers. In certain example embodiments, once the counter information is retrieved from the hardware registers the counter is reset. Alternatively, the counter information may be left to accumulate over a series of requests. In certain example embodiments, the data from different sampled intervals may be stored in a database or the like and the value for a given interval may be calculated (e.g., by subtracting one value from another value). However, in either instance, data from the hardware performance counter registers may be retrieved and recorded for future use. In certain embodiments, a user may use stored data to compare the results against different builds or different versions of the same computer program. Alternatively, the stored data may be compared against different computer programs that execute similar code paths. Such a process may facilitate tracking down bugs or performance issues introduced in new versions or builds of a computer program. Further, in certain example embodiments this comparison process may be automated such that with each build a report (e.g., a graphical report) is generated for a user to view. The report may be the same as or similar to the composite view created in, for example, FIG. 3B.

Next, in step 308 a sample of the currently executing piece of code of the computer program is taken. The sample information may be in the form of the current call stack or executing function. The code information may then be associated with the above counter data. It will be appreciated that the order of obtaining counter and function data may be modified (e.g., the executing function is retrieved and then the counter data is retrieved). In certain example embodiments, the retrieval of these two pieces of information is preferably done in a simultaneous manner so that the two pieces of data correlate to the same time period. However, in certain example embodiments, the retrieval of the different types of information may be done independently (e.g., the sampling of both information types is independent of the other information type).

As mentioned above, steps 306 and 308 may be repeated until a set of performance counter and sample function data is obtained. In certain example embodiments, an analysis program repeats the above steps for a predetermined period of time (e.g., 10 seconds or 60 frames of execution). In certain example embodiments, the analysis program repeats the steps until a user cancels the process of gathering data. In certain example embodiments, steps 306 and 308 continue gathering data until the profiled computer program terminates.

The sampling rate (e.g., how often an executing computer program is sampled) may be modified based on the preferences of a user. For example, a user may set the sampling rate to be 10 times per frame, or may set the sampling rate to a predetermined interval (e.g., every 1 ms). In certain example embodiments, the sampling may be based off of a hybrid random distribution, as described in, for example U.S. Patent Publication No. 2010/0083234, the entire contents of which are hereby incorporated by reference.

After termination of the sampling process, in step 308 the gathered data of steps 306 and 308 is processed. In certain example embodiments, step 310 includes specifying a set of segments of the acquired data over which the data will be processed. As discussed above, certain computer programs, such as video games, may be highly repetitive and predictable in terms of code execution. Accordingly, in certain example embodiments, the data segment that is selected may be, for example, one frame. This selection may be automated or manual. Alternatively, in certain example embodiments, a user may specify a period of time to define a segment (e.g., 1 second). A user may specify a group of segments (e.g., 5 frames or 5 "normal" segments). In certain example embodiments, the segment may be based on a particular section of code (e.g., the artificial intelligence process of the main executing loop).

Once the segment size is determined (either dynamically or as a predetermined value), the segments may be processed. As discussed below, in certain example embodiments, the data from each of the segments may be overlaid onto one segment. For example, with an exemplary video game, sampled performance counter data and sampled function data are overlaid into one segment, aligned by the frame.

Once the data is processed, the results may then be displayed to the user in step 312.

Figure 3B:
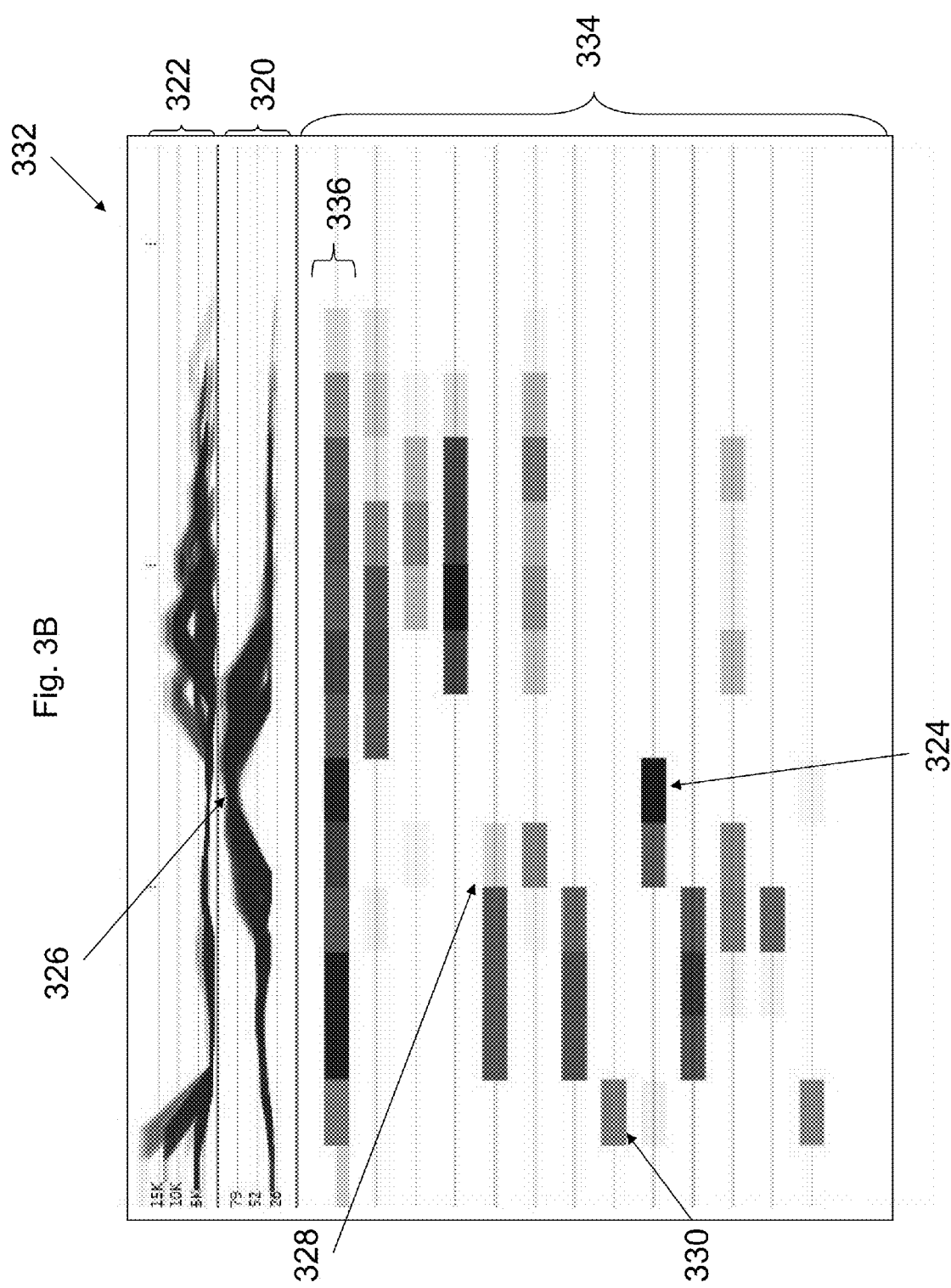
FIG. 3B is an illustrative portion of a screenshot of example sampled data presented in a composite display according to certain example embodiments.
Figure 3C:
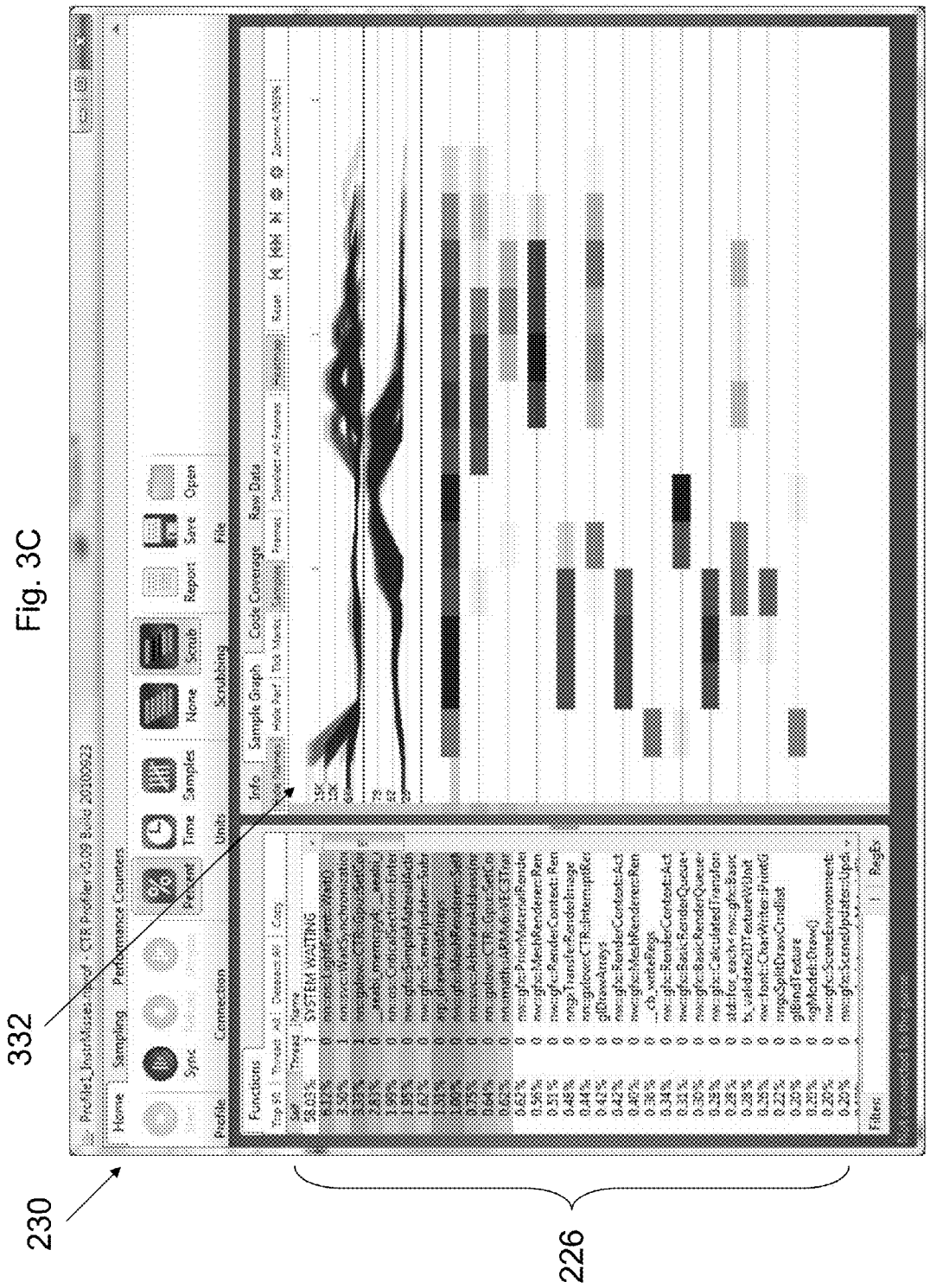
FIG. 3C is an illustrative screenshot corresponding to the portion shown in FIG. 3B.

FIG. 3B shows an illustrative screenshot of processed sampled data according to certain example embodiments. The data represented in the graphical display of FIG. 3B corresponds to the example data shown in the graph in FIG. 2B. FIG. 3C is a screen shot of an exemplary analysis application that correspond to the illustrative screenshot of FIG. 3B. FIG. 3B-C and FIG. 3C-C are color drawings according to certain example embodiments that correspond to FIGS. 3B and 3C respectively.

As discussed above, it may be desirable to obtain information regarding the abnormalities 220 shown FIG. 2B. However, as discussed above, correlating the abnormalities 220 based on the information presented in FIG. 2B may be difficult.

Graphical window 332 includes graphs 320, 322 and 334. The data represented in graphs 320 and 322 respectively corresponds to the data presented in graphs 210 and 212 of FIG. 2B. Similarly, the data presented in graph 334 corresponds to graph 214.

The data shown in FIG. 2B is overlaid to form graphs the graphs shown in FIG. 3B. The data of each of the intervals 216 is overlaid to form a composite display. This overlapping/overlaying process may cause the data from different frames that coincide at a given data point to appear more "intense." The intensity of a given point of data in the composite display (e.g. graphs 320, 322, and 334) may provide a user with an indication that a particular function or performance counter (or other sampled information) happens relatively frequently at a particular point in a frame. As with FIG. 2B, the markers in graph 334 represent sampled functional information. However, in FIG. 3B the functional information is a composite display of the sampled functional information. For example, markers 328 and 330 represent functions sampled at a particular point in the frame. Marker 330 appears occurs relatively early in the execution of the frame. Further, the intensity of the marker indicates that this particular function occurs fairly frequently and/or consistently at this point in execution. By referencing the function window 226 a user may determine the marker 330 relates to "nw::gfx::SceneUpdater:: . . . " Similarly, a user may determine that marker 328 relates to the "memcpy4" function. Also, marker 324 (in dark blue in the color drawing) may relate to the "arp_drawHostArrarys" function shown in function window 226. As can be seen from the color drawings, the intensity of the color of marker 328 is less than the intensity of marker 330. This intensity value may allow a user to quickly determine how consistent or common a particular function call is at a point in time. Functions 336 represent the combined information presented in the rest of graph 334.

Furthermore, the overlaying process also overlays the data in graphs 210 and 212. In certain example embodiments, the graphical data for each of the frames shown in graph 210 is drawn into the composite display of graph 320. In graph 320 each frame of information is drawn relatively lightly (e.g., by increasing the alpha value of the display line. Accordingly, the abnormalities 220 present in each frame of FIG. 2B (to varying degrees) are each shown in the composite view of graph 320. By aligning the data from each frame on a frame-by-frame basis, a consistent display of the abnormalities may be formed in the graph 320. The composite view may show that the abnormality 220 occurs at point 326 within the composite frame. As shown, the increase in cache misses is fairly consistent across the sampled frames. Accordingly, where the lightly drawn lines of individual frames overlap the color of the line may become more solid or intense (e.g., the alpha value for that point may be proportionally decreased based on the number of points overlapping)

As shown in FIG. 3B, the function represented by marker 324 (dark blue in the color drawings) appears to be correlated to the increased number of cycles per missed instruction. Indeed for the point 326, marker 324 appears to be the only function that would qualify as a function that may be causing the problem indicated by the abnormalities. It will be appreciated that this same correlation may not have been made as efficiently with the graphical data shown in FIG. 2B. Thus, the composite display may facilitate correlation of function data to sampled performance counter data.

The rendering of the graphical display shown in FIG. 3B may be accomplished according to various techniques. As noted above, in certain example embodiments, the data of each data segment (e.g., frame) is drawn very lightly. In other words, data points from each frame are assigned a certain weight or intensity and the data points from each frame are drawn into the composite graphical display.

In certain example embodiments, the weight of an individual frame may be a predetermined value. For example, a single frame may have a fractional value of $\frac{1}{255}$. Thus, when two frames overlap at a data point the weight or intensity of a given data point on the composite display may be $\frac{2}{255}$. Accordingly, when 255 frames overlap at a particular point the data point displayed in the composite frame may be at a "maximum" intensity. In other words, the increasing intensity of overlapping data points may function similar to heat map. The intensity of a given point of data may be represented visually by adjusting the alpha value or other color property.

In certain embodiments, the fractional intensity for each of the data points may be dynamically determined based on the number data segments (e.g., frames) that make up the composite display. For example, if 1000 frames are used to provide input to the composite display, each data point from a frame may be assigned a fractional weight of $\frac{1}{1000}$. In other example embodiments, if the total number of sampled frames is 1000, then the fractional weight of each data point may be $\frac{1}{100}$.

In certain example embodiments, the composite display may apply color changes to indicate intensity of a particular data point. For example, a low intensity portion of a graph may be indicated by a yellow color. Accordingly, as the intensity of the data points increases (e.g., more samples are overlaid onto a given data point) the color may change to red as the green component of yellow is gradually reduced. It will be appreciated that other techniques of varying the colors may be used (e.g., adding blue, subtracting red, etc). In certain example embodiments, various techniques for blending may be used (e.g., additive blending) to show changes in intensity. In certain example embodiments, the color and/or intensity changes may facility recognition of trends in the sampled data that may otherwise be more difficult to observe.

Accordingly, visual information may facilitate quicker and/or more accurate correlation of different types of sampled data of an executing computer program.

Figure 3D:
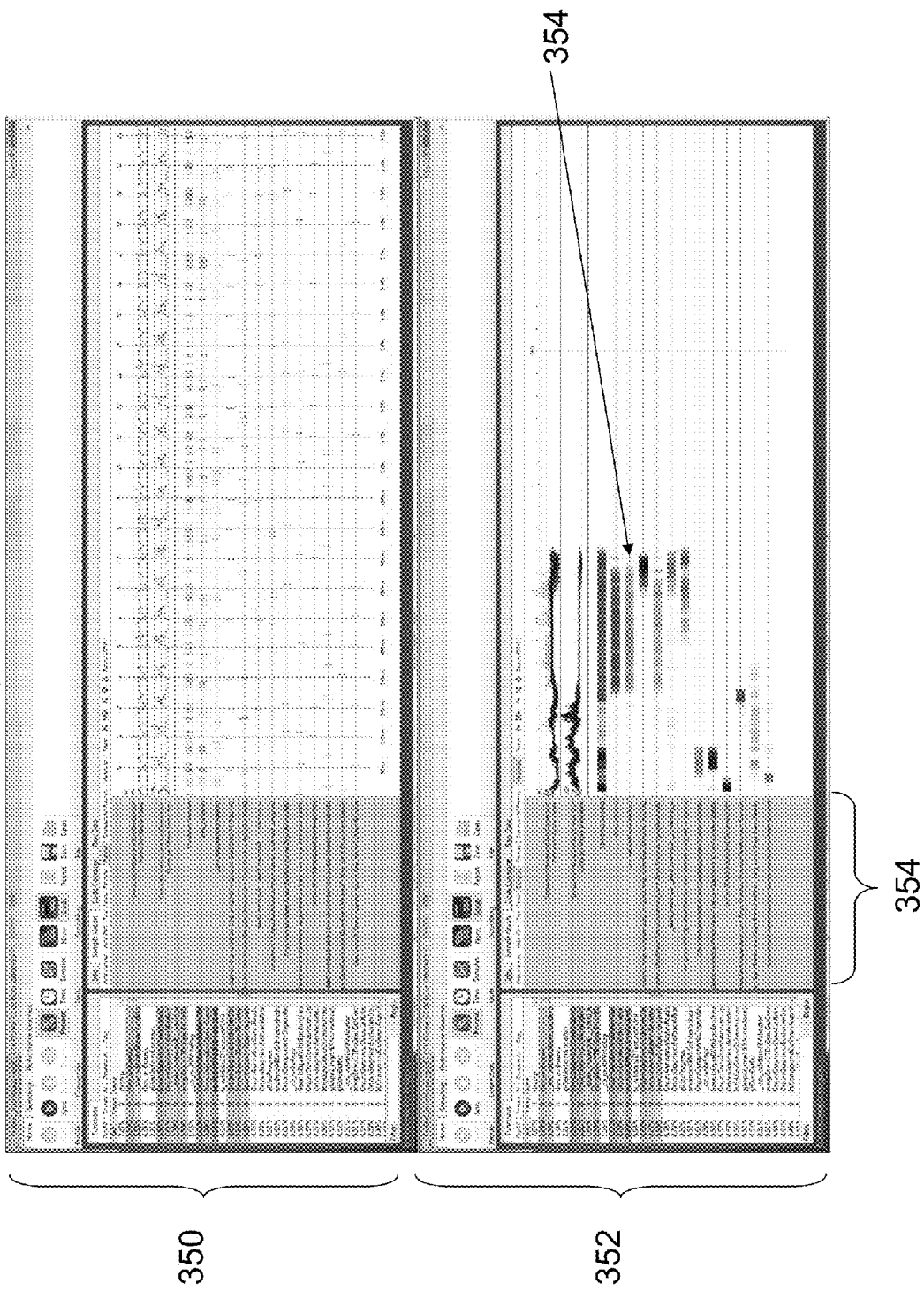
FIG. 3D is another illustrative screenshot of sampled data in a non-composite form and a composite form according to certain example embodiments.

FIG. 3D shows multiple screenshots presented for a side-by-side comparison. Windows 350 and 352 correspond to the graphical windows shown in FIG. 2C and 3C respectively. However, the sampled data that is the basis for the graphical representation within windows 350 and 352 is different. Furthermore, in this view, the names of each row of information are presented in the column area 354. Accordingly, the functional information presented by the green markers 354 is associated with "_shv_validateShaderValidate." As can be seen in the example data, the composite view shows more variable activity in the hardware performance counter at the beginning of the frame.

As discussed above, in certain example embodiments, data is retrieved and then processed and presented. In certain example embodiments, the presentation of the data may be accomplished while the data is sampled from a running computer program. FIG. 4 is an illustrative flow chart showing a process for analyzing a computer program in real-time according to certain example embodiments. In step 400, various settings may be initialized to prepare for sampling and/or execution of the computer program (e.g., performance counters are set, etc). In step 402 a user executes an application. In certain example embodiments, after beginning the execution of the application, the user attaches the analysis program to the executing application. Once the application to sampled and the analysis program are running, then, in step 404, performance counter data is gathered for some interval of execution of the application. As noted above, this may either be a predetermined interval or an interval that is dynamically determined. Further, when the analysis program retrieves performance counter data, data on the currently executing source code section may also be sampled (e.g., the currently executing function) in step 406. In step 408, the sampled data may then be rendered into a composite display or presentation. Thus, steps 404, 406, and 408 may be repeated to produce a composite display of sampled analysis data.

In certain example embodiments, sampled data may be gathered for one frame and then incorporated into a composite presentation. Alternatively, the sampled data may be rendered directly to the composite display as it is sampled (e.g., the composite display is updated 10 times per frame). The data points may be interpolated in real-time (e.g., for graphs 320 and 322). Thus, a user may view the sampled information in real time and stop the process when sufficient data has been sampled (e.g., the user recognizes a potential source of a problem) in step 410.

In certain example embodiments, instead of overlaying each sampled frame, the data for each frame may be averaged. For example, a graph of sampled frame of information may average the sampled data into one line of data. Accordingly, in a real-time example embodiment the single line representing the averaged data may adjust as new data is averaged into the graph. This information may be supplemented by a standard deviation calculation. In certain example embodiments, one or more of the above embodiments may be combined (e.g., an averaged graph and a composite/overlaid graph is presented).

Certain example embodiments may be implemented via a computer processing system. FIG. 5 is an exemplary illustrative non-limiting block diagram showing a computer system implementing an exemplary software analysis program.

A processing system 506 may include a CPU 510. As discussed above, it is common for microprocessors to include hardware performance counters. These counters track events and store a value related to the certain events (e.g., how many times a certain event has occurred) in special hardware registers located on the CPU 510. The processing system 506 may include system bus 514 that allows for communication between various subsystems of the processing system 506. Various components that communicate over the system bus 514 include RAM 512, network interface 518, display interface 516 (e.g., a video card), non-transitory storage medium 526, and user input adapter 508. It will be appreciated by those skilled in the art that other components and or subsystems may be implemented. User input device 502 communicates with the processing system 506 through the user input adapter 508. User input device 502 may include, for example, a keyboard, a mouse, a track-pad, etc. Display 520 communicates with processing system 506 through display interface 516. A database 522 is connected to the processing system through the network interface. The database 522 may hold sampled profile data. In certain example embodiments, the database may hold previously acquired profiled data to allow for performance comparisons between different builds (or different applications). External system 528 may also be connected through the network interface 518. External system 528 may include a separate processing system (similar to processing system 506). In certain example embodiments, the separate processing system of the external system 528 may run the application that is being profiled.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

The above description is provided in relation to embodiments which may share common characteristics, features, etc. It is to be understood that one or more features of any embodiment may be combinable with one or more features of other embodiments. In addition, single features or a combination of features may constitute an additional embodiment(s).

While the invention has been described in connection with what is presently considered to be the preferred embodiment(s), it is to be understood that the invention is not to be limited to the disclosed embodiment(s), but on the contrary, is intended to cover various modifications and equivalent arrangements included within the spirit and scope of the claims.

We claim:

1. A computer implemented method for gathering and presenting statistical data of a computer program, at least one processor of a computing system performing the method comprising:
   sampling first and second types of profile data related to execution of the computer program over a plurality of data segments, the second type of profile data different from the first type of profile data;
   for each of the plurality of data segments, assigning a value to each of the first and second types of profile data within the respective data segment;
   creating a composite presentation of the first and second type of profile data by combining the assigned values of the first and second types of profile data for each one of the plurality of data segments into the composite presentation; and
   presenting the composite presentation of the first and second type of profile data.

2. The method of claim 1, wherein the first type of profile data is a hardware performance counter.

3. The method of claim 2, wherein the second type of profile data is associated with a section of executing code and is sampled from a call stack.

4. The method of claim 1, wherein the computer program is a video game.

5. The method of claim 1, wherein the data segments are frames of execution of the computer program.

6. The method of claim 1, wherein the assigned value is a fractional value that is assigned based at least in part on the total number of data segments over the period of time.

7. The method of claim 1, further comprising rendering each of the sampled first and second types of profile data based at least in part on the assigned value to the composite presentation such that corresponding first and/or second types of profile data in separate data segments overlap.

8. The method of claim 7, wherein rendering each sampled first and second types of profile data occurs before the next data segment is sampled.

9. A non-transitory computer readable storage medium tangibly storing instructions for sampling a video game program that, in use, is executed by a processing system that includes at least one hardware performance counter, the stored instructions, when processed by at least one processor, execute the stored instructions comprising instructions configured to:
   obtain first and second sampled data based the video game program during execution thereof, the first and second sampled data including at least first and second sampled functions and at least first and second performance counter values that respectively correspond to the first and second sampled functions;
   overlay the first sampled data and the second sampled data into a composite display;
   increase a first color value at a position within the composite display where the first and second performance counter values coincide;
   increase a second color value at a position in the composite display where the first and second sampled functions coincide; and
   output the composite display to a video display device,
   wherein the first and second sampled data each correspond to different frames of execution of the video game program.

10. The medium of claim 9, wherein the first color value is an alpha value.

11. A non-transitory computer readable storage medium tangibly storing instructions that, when processed by at least one processor, execute the stored instructions comprising instructions configured to:
   interact with an executing program;
   sample performance data from the executing computer program over a plurality of segments, at least one sample of performance data sampled for each one of the plurality of segments; and
   generate a combined view display of the sampled performance data of each one of the plurality of segments,
   wherein when sampled performance data from one of the plurality of segments coincides with sampled performance data from another one of the plurality of segments the displayed combined view of the sampled performance data is changed in color and/or intensity,
   wherein the performance data includes at least two different types of sampled performance data.

12. The medium of claim 11, wherein the at least two different types of sampled performance data include sampled performance counter data and sampled function data.

13. The medium of claim 12, wherein the executing program is a video game operating at a frame rate and each one of the plurality of segments is related to a frame of the execution of the program.

14. The medium of claim 11, wherein an amount of color and/or intensity change is related to a total number of the plurality of segments.

15. The medium of claim 11, wherein an amount of color and/or intensity change is a predetermined amount.

16. The medium of claim 11, wherein the instructions are further configured to successively draw the sampled performance data as the performance data is sampled from the executing program.

17. A computer analysis system for presenting performance data to a user, the system comprising:
at least one microprocessor configured to:
execute a target computer program, the target computer program configured to execute similar code pathways for each one of a plurality of data segments;
record performance counter information on the target computer program when the target computer program is executed on the at least one microprocessor; and
a processing system configured to:
sample performance information associated with the executing target computer program at least once for each of the plurality of data segments, the performance information including recorded performance counter information and a section of source code that is associated with the recorded performance counter information;
for each one of the plurality of data segments, draw the sampled performance information into a composite display;
adjust a display value in the composite display when sampled performance information from one of the plurality of data segments overlaps with the sampled performance information from another one of the plurality of data segments; and
present the composite display to a user.

18. The system of claim 17, wherein the composite display is updated in substantially real-time for each of the plurality of data segments.

19. The system of claim 17, wherein the composite display is a heat map.

20. The system of claim 17, wherein the display value is adjusted based at least in part on a total number of the plurality of data segments.

21. The system of claim 17, wherein the data segment is a frame of display of a video game.

22. The system of claim 17, wherein the performance information is sampled a plurality of times for each one of the plurality of data segments.

* * * * *